United States Patent
Fang

(10) Patent No.: US 10,947,084 B2
(45) Date of Patent: Mar. 16, 2021

(54) SYSTEM AND METHOD FOR AUTOMATICALLY ENTERING AND LEAVING RIDE APPARATUS

(71) Applicant: CAINIAO SMART LOGISTICS HOLDING LIMITED, Grand Cayman (KY)

(72) Inventor: Qiang Fang, Hangzhou (CN)

(73) Assignee: Cainiao Smart Logistics Holding Limited, Grand Cayman (KY)

(*) Notice: Subject to any disclaimer, the term of this patent is extended or adjusted under 35 U.S.C. 154(b) by 303 days.

(21) Appl. No.: 15/787,308

(22) Filed: Oct. 18, 2017

(65) Prior Publication Data
US 2018/0111791 A1 Apr. 26, 2018

(30) Foreign Application Priority Data
Oct. 21, 2016 (CN) .......................... 201610921809.7

(51) Int. Cl.
*B66B 1/34* (2006.01)
*G05D 1/00* (2006.01)
(Continued)

(52) U.S. Cl.
CPC .............. *B66B 1/3461* (2013.01); *B66B 1/28* (2013.01); *B66B 1/468* (2013.01); *G05D 1/0088* (2013.01);
(Continued)

(58) Field of Classification Search
CPC ......... B66B 1/3461; B66B 1/28; B66B 1/468; B66B 2201/4638; B66B 2201/4653;
(Continued)

(56) References Cited

U.S. PATENT DOCUMENTS 4,674,048 A 6/1987 Okumura
4,816,998 A 3/1989 Ahlbom
(Continued)

FOREIGN PATENT DOCUMENTS

CN 101759068 A 6/2010
CN 105354667 A 2/2016
(Continued)

OTHER PUBLICATIONS

Examination Report No. 1 dated Oct. 4, 2019, issued in related Australian Patent Application No. 2017346866 (3 pages).
(Continued)

*Primary Examiner* — Rami Khatib
(74) *Attorney, Agent, or Firm* — Sheppard Mullin Richter & Hampton LLP

(57) ABSTRACT

The present disclosure provides systems and methods for automatically entering and leaving a ride apparatus. A method for automatically entering a ride apparatus comprises: establishing a wireless communication connection with a control system of the ride apparatus; sending, via the wireless communication connection, an automatic entering request to the control system, the automatic entering request comprising a ride starting position; receiving, via the wireless communication connection, status information sent by the control system; and determining, according to the status information, that the ride apparatus has arrived at the ride starting position, and automatically entering the ride apparatus.

13 Claims, 7 Drawing Sheets

(51) Int. Cl.
*B66B 1/28* (2006.01)
*B66B 1/46* (2006.01)
*H04W 84/18* (2009.01)
*H04W 76/10* (2018.01)

(52) U.S. Cl.
CPC ... *B66B 2201/10* (2013.01); *B66B 2201/4623* (2013.01); *B66B 2201/4638* (2013.01); *B66B 2201/4653* (2013.01); *H04W 76/10* (2018.02); *H04W 84/18* (2013.01)

(58) Field of Classification Search
CPC ...... B66B 2201/101; B66B 2201/4623; G05D 1/0088; H04W 76/10; H04W 84/18; H04W 48/02; H04W 48/16; H04W 48/20; H04B 7/26
See application file for complete search history.

(56) References Cited

U.S. PATENT DOCUMENTS

| | | | |
|---|---|---|---|
| 5,175,480 A | 12/1992 | McKeefrey et al. | |
| 5,192,836 A * | 3/1993 | Schroder | B66B 1/468 |
| | | | 187/384 |
| 5,488,277 A | 1/1996 | Nishikawa et al. | |
| 5,867,800 A | 2/1999 | Leif | |
| 5,908,466 A | 6/1999 | Veugen et al. | |
| 6,246,930 B1 | 6/2001 | Hori | |
| 7,183,919 B2 | 2/2007 | Wang | |
| 8,010,230 B2 | 8/2011 | Zini et al. | |
| 8,210,321 B2 | 7/2012 | Finschi et al. | |
| 8,910,752 B2 | 12/2014 | Furutani | |
| 8,958,910 B2 | 2/2015 | Ichinose et al. | |
| 9,317,037 B2 | 4/2016 | Byford et al. | |
| 2004/0035315 A1 | 2/2004 | Richards | |
| 2006/0092033 A1 | 5/2006 | Hoff et al. | |
| 2007/0151809 A1 * | 7/2007 | Tyni | B66B 3/00 |
| | | | 187/391 |
| 2007/0276558 A1 | 11/2007 | Kim | |
| 2008/0051951 A1 | 2/2008 | Camacho | |
| 2009/0143923 A1 | 6/2009 | Breed | |
| 2010/0034626 A1 * | 2/2010 | Reiniger | E04H 6/183 |
| | | | 414/253 |
| 2010/0104392 A1 | 4/2010 | Bowen et al. | |
| 2010/0183409 A1 | 7/2010 | Checketts et al. | |
| 2011/0082588 A1 | 4/2011 | McDowell et al. | |
| 2012/0029697 A1 | 2/2012 | Ota et al. | |
| 2012/0041593 A1 * | 2/2012 | Ichinose | B66B 1/2458 |
| | | | 700/258 |
| 2012/0200259 A1 | 8/2012 | Sullivan et al. | |
| 2014/0257630 A1 | 9/2014 | Ruiz et al. | |
| 2015/0339910 A1 | 11/2015 | Stenzler | |
| 2016/0214834 A1 * | 7/2016 | Cunningham | B66B 5/18 |
| 2017/0123423 A1 * | 5/2017 | Sako | G06Q 30/0645 |
| 2017/0153645 A1 * | 6/2017 | Aoyagi | G05D 1/0225 |
| 2018/0093860 A1 * | 4/2018 | Saperstein | B66B 5/0012 |
| 2018/0171655 A1 * | 6/2018 | Scherer | G08G 1/146 |

FOREIGN PATENT DOCUMENTS

| | | | | |
|---|---|---|---|---|
| CN | 105911969 A | 8/2016 | | |
| JP | H07-247070 A | 9/1995 | | |
| JP | 2000-339030 A | 12/2000 | | |
| JP | 2001-220066 A | 8/2001 | | |
| JP | 2001-220076 A | 8/2001 | | |
| JP | 2012-017184 A | 1/2012 | | |
| JP | 2013-216408 A | 10/2013 | | |
| WO | WO-2012093985 A1 * | 7/2012 | | B66B 1/468 |
| WO | 2014/096455 A1 | 6/2014 | | |

OTHER PUBLICATIONS

International Search Report and Written Opinion for Application No. PCT/US2017/057196, dated Feb. 12, 2018, 18 pages.
Examination Report No. 2 dated May 5, 2020, issued in related Australian Patent Application No. 2017346866 (5 pages).
Notice of Reasons for Refusal dated Jul. 14, 2020, issued in related Japanese Patent Application No. 2019-521058 with English machine translation (27 pages).
First Search dated Jul. 4, 2019, issued in related Chinese Application No. 201610921809.7 (2 pages).
First Office Action dated Jul. 15, 2019, issued in related Chinese Application No. 201610921809.7, with English machine translation (32 pages).
Supplemental Search dated Jan. 20, 2020, issued in related Chinese Application No. 201610921809.7 (2 pages).
Second Office Action dated Mar. 3, 2020, issued in related Chinese Application No. 201610921809.7, with English machine translation (29 pages).

* cited by examiner

601: A control system of a transport vehicle receives a troubleshooting request from the transport vehicle, and the troubleshooting request indicates that the transport vehicle detects an abnormal status

FIGURE 6

701: A portable apparatus establishes wireless communication connection with a control system of the ride apparatus

702: The portable apparatus sends, based on the wireless communication connection, a status control request to the control system, and the status control request is used to request the control system to control the running status of the ride apparatus

FIGURE 7

SYSTEM AND METHOD FOR AUTOMATICALLY ENTERING AND LEAVING RIDE APPARATUS

CROSS REFERENCE TO RELATED APPLICATIONS

The present application is based on and claims priority to the Chinese Application No. 201610921809.7, filed Oct. 21, 2016, the entire contents of which are incorporated herein by reference.

TECHNICAL FIELD

The present application relates to the computer field, and in particular, to systems and methods for automatically entering and leaving a ride apparatus.

BACKGROUND

Aided by the development of computer technologies, various transport vehicles are increasingly used in people's daily life. For example, a robot can transport goods to a designated location.

During transport processes, the transport vehicles may need to ride on some ride apparatuses. For example, the robot may need to ride on an elevator. Therefore, there is an urgent need to enable transport vehicles to automatically enter or leave a ride apparatus through automatic control.

SUMMARY

The disclosure provides systems and methods for automatically entering and leaving a ride apparatus, e.g., through automatic control of a ride tool, thereby eliminating the need for manual operations, saving manpower and material resources.

An embodiment of the present disclosure provides a method for automatically entering a ride apparatus, comprising: a transport vehicle establishes wireless communication connection with a control system of the ride apparatus; the transport vehicle sends, based on the wireless communication connection, an automatic entering request to the control system, and the automatic entering request carries a ride starting position; the transport vehicle receives, based on the wireless communication connection, status information sent by the control system; and the transport vehicle determines, according to the status information, that the ride apparatus has arrived at the ride starting position, and automatically enters the ride apparatus.

Optionally, the method further comprises: the transport vehicle determines if a current load number of the ride apparatus is smaller than a preset threshold; if yes, the automatically entering the ride apparatus is executed; if no, the automatic entering request is resent after a first predetermined time.

Optionally, the control system comprises an external access point outside the ride apparatus and an internal access point inside the ride apparatus; the establishing wireless communication connection by the transport vehicle with the control system of the ride apparatus comprises the transport vehicle establishes wireless communication connection with the external access point. After automatically entering the ride apparatus, the method further comprises: the transport vehicle initiates wireless communication connection with the internal access point; and if the transport vehicle is unable to establish wireless communication connection with the internal access point, it automatically leaves the ride apparatus.

Optionally, before automatically entering the ride apparatus, the method further comprises: the transport vehicle sends a locking request to the control system of the transport vehicle; and the transport vehicle determines if a locking instruction is received from the control system of the transport vehicle; if yes, the automatically entering the ride apparatus is executed, and the locking instruction indicates that the number of currently locked transport vehicles is smaller than a preset threshold.

Optionally, the transport vehicle automatically entering the ride apparatus comprises: the transport vehicle acquires a position of an obstacle; the transport vehicle acquires, according to the position of the obstacle, a movement route for automatically entering the ride apparatus; and the transport vehicle automatically enters the ride apparatus according to the movement route.

In one embodiment, before acquiring a movement route for automatically entering the ride apparatus, the method may further comprise: the transport vehicle determines if a movement route for automatically entering the ride apparatus can be acquired; if no, the transport vehicle provides a voice prompt.

In another embodiment, before the transport vehicle automatically enters the ride apparatus, the method may further comprise: the transport vehicle determines, according to the status information, that the ride apparatus is in an open-door status.

The ride apparatus may be configured to be in a delayed closing status after it arrives at the ride starting position and is in an open-door status. The delayed closing status disables the manual closing button of the ride apparatus for a third predetermined time. The method may further comprise: after it automatically enters the ride apparatus, the transport vehicle sends a closing request to the control system, and the closing request is used to request the control system to switch the ride apparatus to a closed-door status.

Optionally, after the transport vehicle sends an automatic entering request to the control system, the method further comprises: the transport vehicle sends a status check request to the control system, and the status check request is used to request the control system to send status information of the ride apparatus; and if the transport vehicle determines, according to the status information, that the ride apparatus has not arrived at the ride starting position, the transport vehicle resends the status check request after a fourth predetermined time.

Optionally, the method further comprises: the transport vehicle detects an abnormal status and sends a troubleshooting request to the control system of the transport vehicle; wherein the abnormal status comprises any one or more of the following statuses: the transport vehicle fails to establish wireless communication connection with the control system of the ride apparatus, and the transport vehicle fails to receive status information sent by the control system.

The transport vehicle may comprise a wheelchair, a Segway, or a robot.

An embodiment of the present disclosure provides a method for automatically leaving a ride apparatus, comprising: a transport vehicle establishes wireless communication connection with a control system of the ride apparatus; the transport vehicle sends, based on the wireless communication connection, an automatic leaving request to the control system, and the automatic leaving request carries a ride ending position; the transport vehicle receives, based on the wireless communication connection, status information sent by the control system; and the transport vehicle determines, according to the status information, that the ride apparatus has arrived at the ride ending position, and automatically leaves the ride apparatus.

In some embodiments, before automatically leaving the ride apparatus, the method further comprises: after the ride apparatus arrives at the ride ending position, and if the transport vehicle cannot leave the ride apparatus when the ride apparatus starts up and leaves the ride ending position, the transport vehicle resends the automatic leaving request after a second predetermined time.

Optionally, the transport vehicle automatically leaving the ride apparatus comprises: the transport vehicle acquires a position of an obstacle; the transport vehicle acquires, according to the position of the obstacle, a movement route for automatically leaving the ride apparatus; and the transport vehicle automatically leaves the ride apparatus according to the movement route.

Optionally, before acquiring a movement route for automatically leaving the ride apparatus, the method further comprises: the transport vehicle determines if a movement route for automatically leaving the ride apparatus can be acquired; if no, the transport vehicle provides a voice prompt.

Optionally, before the transport vehicle automatically leaves the ride apparatus, the method further comprises: the transport vehicle determines, according to the status information, that the ride apparatus is in an open-door status.

The ride apparatus may be in a delayed closing status after it arrives at the ride ending position and is in an open-door status. The delayed closing status disables the manual closing button of the ride apparatus for a third predetermined time. The method may further comprise: after it automatically leaves the ride apparatus, the transport vehicle sends a closing request to the control system, and the closing request is used to request the control system to switch the ride apparatus to a closed-door status.

Optionally, after the transport vehicle sends an automatic leaving request to the control system, the method further comprises: the transport vehicle sends a status check request to the control system, and the status check request is used to request the control system to send status information of the ride apparatus; and if the transport vehicle determines, according to the status information, that the ride apparatus has not arrived at the ride starting position, the transport vehicle resends the status check request after a fourth predetermined time.

Optionally, the method further comprises: the transport vehicle detects an abnormal status and sends a troubleshooting request to the control system of the transport vehicle; wherein the abnormal status comprises any one or more of the following statuses: the transport vehicle fails to establish wireless communication connection with the control system of the ride apparatus, and the transport vehicle fails to receive status information sent by the control system.

An embodiment of the present disclosure provides a method for controlling a ride apparatus, comprising: a control system of the ride apparatus establishes wireless communication connection with a transport vehicle; the control system receives, based on the wireless communication connection, an automatic entering request from the transport vehicle, and the automatic entering request carries a ride starting position; the control system controls the ride apparatus to move to the ride starting position; and the control system sends, based on the wireless communication connection, status information to the transport vehicle, and the status information indicates that the ride apparatus has arrived at the ride starting position.

Optionally, the method further comprises: the control system controls the ride apparatus to be in an open-door status after the ride apparatus arrives at the ride starting position.

After the ride apparatus arrives at the ride starting position and if the ride apparatus is in an open-door status, the method further comprises: the control system controls the ride apparatus to be in a delayed closing status. The delayed closing status disables the manual closing button of the ride apparatus for a third predetermined time.

An embodiment of the present disclosure provides a method for controlling a ride apparatus, comprising: a control system of the ride apparatus establishes wireless communication connection with a transport vehicle; the control system receives, based on the wireless communication connection, an automatic leaving request from the transport vehicle, and the automatic leaving request carries a ride ending position; the control system controls the ride apparatus to move to the ride ending position; and the control system sends, based on the wireless communication connection, status information to the transport vehicle, and the status information indicates that the ride apparatus has arrived at the ride ending position.

Optionally, the method further comprises: the control system controls the ride apparatus to be in an open-door status after the ride apparatus arrives at the ride ending position.

Optionally, after the ride apparatus arrives at the ride ending position and is in an open-door status, the method further comprises: the control system controls the ride apparatus to be in a delayed closing status, and the delayed closing status disables the manual closing button of the ride apparatus for a third predetermined time.

An embodiment of the present disclosure provides a troubleshooting method, comprising: a control system of a transport vehicle receives a troubleshooting request from the transport vehicle, and the troubleshooting request indicates that the transport vehicle detects an abnormal status; wherein the abnormal status comprises any one or more of the following statuses: the transport vehicle fails to establish wireless communication connection with the control system of a ride apparatus, and the transport vehicle fails to receive status information sent by the control system of the ride apparatus.

An embodiment of the present disclosure provides a method for controlling a ride apparatus, comprising: a portable apparatus establishes wireless communication connection with a control system of the ride apparatus; and the portable apparatus sends, based on the wireless communication connection, a status control request to the control system, and the status control request is used to request the control system to control the running status of the ride apparatus.

Optionally, the status control request carries an indicated riding position, and the control request is used to request the control system to control the ride apparatus to move to the indicated riding position; or the ride apparatus has a door capable of controlling the on/off status, and the control request is used to request the control system to control the ride apparatus to maintain the open-door status or switch to the closed-door status.

An embodiment of the present disclosure provides a transport vehicle, comprising: a communication module configured to establish wireless communication connection with a control system of a ride apparatus; and a processor module configured to carry out any one of the above methods for automatically entering the ride apparatus or any one of the above methods for automatically leaving the ride apparatus.

An embodiment of the present disclosure provides a control system of a ride apparatus, comprising: a communication module configured to establish wireless communication connection with a transport vehicle; and a processor module configured to carry out any one of the above methods for controlling the ride apparatus.

An embodiment of the present disclosure provides a control system of a transport vehicle, comprising: a receiving module configured to receive a troubleshooting request from the transport vehicle, the troubleshooting request indicating that the transport vehicle detects an abnormal status; wherein the abnormal status comprises any one or more of the following statuses: the transport vehicle fails to establish wireless communication connection with the control system of a ride apparatus, and the transport vehicle fails to receive status information sent by the control system of the ride apparatus.

An embodiment of the present disclosure provides a portable apparatus, comprising: a communication module configured to establish wireless communication connection with a control system of a ride apparatus; and a processor module configured to carry out any one of the above methods for controlling the ride apparatus.

An embodiment of the present disclosure provides a transport vehicle, comprising: a communication unit configured to establish wireless communication connection with a control system of a ride apparatus; a sending unit configured to send, based on the wireless communication connection, an automatic entering request to the control system, the automatic entering request carrying a ride starting position; a receiving unit configured to receive, based on the wireless communication connection, status information sent by the control system; and a movement unit configured to determine, according to the status information, that the ride apparatus has arrived at the ride starting position, and to automatically enter the ride apparatus.

An embodiment of the present disclosure provides a transport vehicle, comprising: a communication unit configured to establish wireless communication connection with a control system of a ride apparatus; a sending unit configured to send, based on the wireless communication connection, an automatic leaving request to the control system, the automatic leaving request carrying a ride ending position; a receiving unit configured to receive, based on the wireless communication connection, status information sent by the control system; and a movement unit configured to determine, according to the status information, that the ride apparatus has arrived at the ride ending position, and to automatically leave the ride apparatus.

An embodiment of the present disclosure provides a control system of a ride apparatus, comprising: a communication unit configured to establish wireless communication connection with a transport vehicle; a receiving unit configured to receive, based on the wireless communication connection, an automatic entering request from the transport vehicle, the automatic entering request carrying a ride starting position; a control unit configured to control the ride apparatus to move to the ride starting position; and a sending unit configured to send, based on the wireless communication connection, status information to the transport vehicle, the status information indicating that the ride apparatus has arrived at the ride starting position.

An embodiment of the present disclosure provides a control system of a ride apparatus, comprising: a communication unit configured to establish wireless communication connection with a transport vehicle; a receiving unit configured to receive, based on the wireless communication connection, an automatic leaving request from the transport vehicle, the automatic leaving request carrying a ride ending position; a control unit configured to control the ride apparatus to move to the ride ending position; and a sending unit configured to send, based on the wireless communication connection, status information to the transport vehicle, the status information indicating that the ride apparatus has arrived at the ride ending position.

An embodiment of the present disclosure provides a control system of a transport vehicle, comprising: a receiving unit configured to receive a troubleshooting request from the transport vehicle, the troubleshooting request indicating that the transport vehicle detects an abnormal status; wherein the abnormal status comprises any one or more of the following statuses: the transport vehicle fails to establish wireless communication connection with the control system of a ride apparatus, and the transport vehicle fails to receive status information sent by the control system of the ride apparatus.

An embodiment of the present disclosure provides a portable apparatus, comprising: a communication unit configured to establish wireless communication connection with a control system of a ride apparatus; and a sending unit configured to send, based on the wireless communication connection, a status control request to the control system, the status control request being used to request the control system to control the running status of the ride apparatus.

In an embodiment of the present disclosure, a transport vehicle establishes wireless communication connection with a control system of the ride apparatus, and uses the wireless communication connection to send an automatic entering request or an automatic leaving request to the control system, wherein the automatic entering request carries a ride starting position and the automatic leaving request carries a ride ending position, such that the control system controls the ride apparatus to move to the ride starting position or the ride ending position. When the transport vehicle determines, according to the status information sent by the control system, that the ride apparatus has arrived at the ride starting position or the ride ending position, it automatically enters or leaves the ride apparatus. The disclosed method for automatic control of a ride tool by a transport vehicle can achieve automatic entering or leaving a ride apparatus, eliminating the need for manual operations and saving manpower and material resources.

BRIEF DESCRIPTION OF THE DRAWINGS

The accompanying drawings in the following description are merely exemplary. To a person skilled in the art, other drawings may be obtained according to these drawings.

FIG. 6 is a flow chart of a troubleshooting method consistent with the exemplary embodiments of the present disclosure;

FIG. 7 is a flow chart of a method for controlling a ride apparatus consistent with the exemplary embodiments of the present disclosure;

DETAILED DESCRIPTION

The described embodiments are merely exemplary. All other embodiments obtained by a person skilled in the art without inventive effort and on the basis of the embodiments of the present disclosure shall be encompassed by the present application.

Aided by the development of computer technologies, applications of transport vehicles become increasingly common. In practical applications, transport vehicles (e.g., robots) often need to ride on some ride apparatus (e.g., an elevator). If a transport vehicle can automatically control a ride apparatus and achieve automatic riding, the steps of manual operations can be obviated, and manpower and material resources can be conserved. For example, when the ride apparatus is an elevator or other elevating equipment, a robot can transport goods to a designated floor by automatically entering and automatically leaving the elevator.

A method for automatically entering and leaving a ride apparatus and a related device is disclosed, such that a transport vehicle can automatically enter or leave a ride apparatus through automatic control of a ride tool, thereby eliminating the need for manual operations and saving manpower and material resources.

Figure 1:
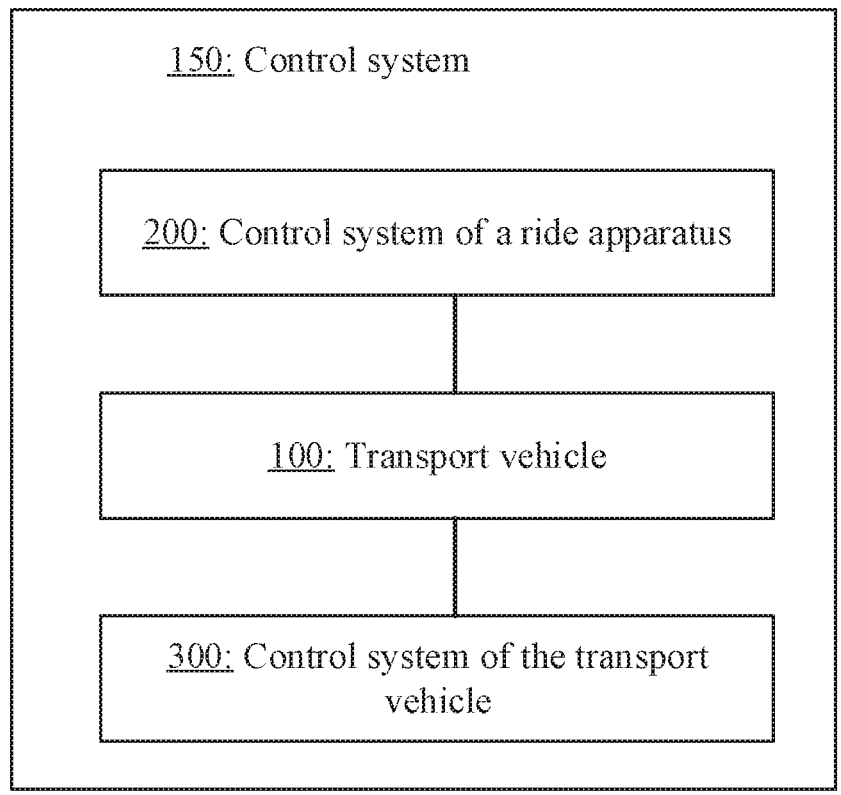
FIG. 1 is a structural schematic diagram of a control system consistent with the exemplary embodiments of the present disclosure.
Figure 2:
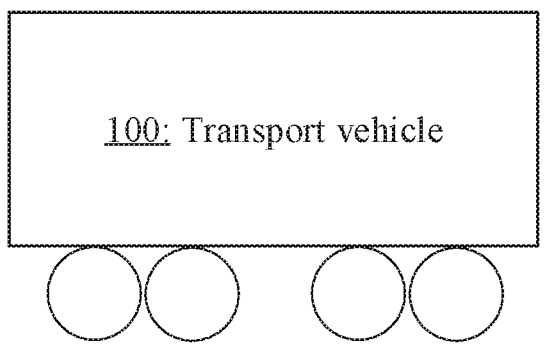
FIG. 2 is a schematic diagram of a transport vehicle consistent with the exemplary embodiments of the present disclosure.

Some embodiments of the present disclosure can be implemented through interaction between a transport vehicle, a control system of a ride apparatus, and a control system of the transport vehicle. As shown in FIG. 1, a control system 150 comprises a transport vehicle 100, a control system 200 of a ride apparatus, and a control system 300 of the transport vehicle. The transport vehicle 100 may be a tool capable of carrying and transporting goods. For example, the transport vehicle 100 may comprise a self-balancing scooter, a robot, or a wheelchair. FIG. 2 illustrates an example transport vehicle 100, and the transport vehicle can move on rollers. Alternative to the rollers shown in FIG. 2, the transport vehicle 100 may further move on a track and the like, which is not limited by embodiments of the present disclosure. The control system 300 of the transport vehicle can be connected with the transport vehicle 100 by means of wireless communication. The control system 300 can receive status information, troubleshooting requests, and the like from the transport vehicle 100, and control the operating status of the transport vehicle 100, for example, control the transport vehicle 100 to move in a designated direction. The ride apparatus may be configured to transport objects. For example, the ride apparatus may comprise an elevator or other elevating equipment, vehicles, and the like. The control system 200 of the ride apparatus may be used to control operating statuses of the ride apparatus, for example, it may be an elevator control system that controls the up and down, door opening, and the like of the elevator.

Figure 3:
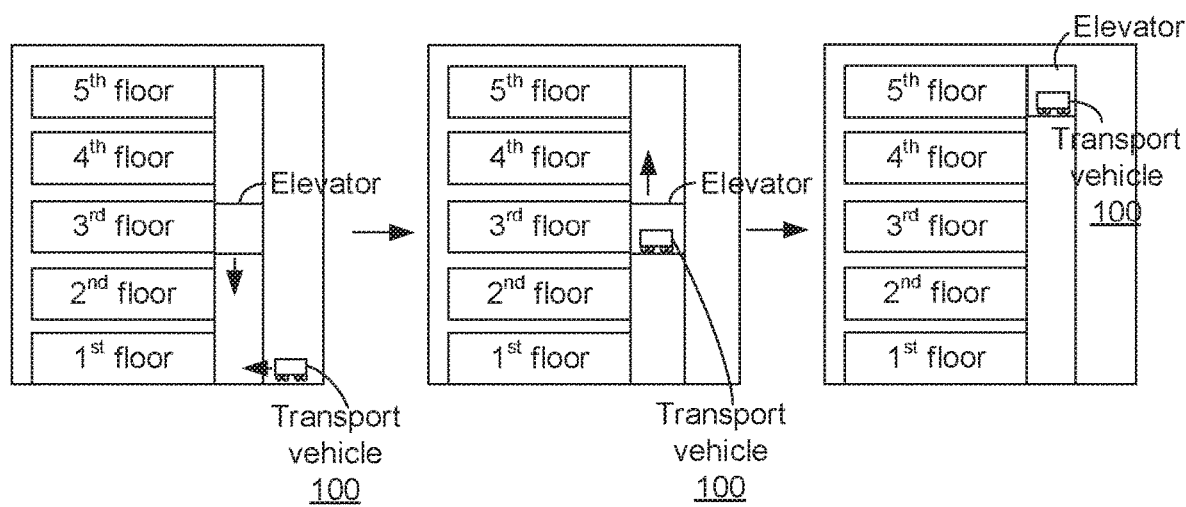
FIG. 3 is a schematic diagram of a scenario consistent with the exemplary embodiments of the present disclosure.

As shown in FIG. 3, in some embodiments, the transport vehicle 100 can be controlled to automatically enter and leave the elevator, thereby achieving automatic rides. For example, when on the $1^{st}$ floor, the transport vehicle 100 sends an automatic entering request to the control system 200, the automatic entering request comprising a ride starting position such as the $1^{st}$ floor, so that the elevator moves to the $1^{st}$ floor. When the ride apparatus arrives at the $1^{st}$ floor, the transport vehicle 100 automatically enters the elevator. Before entering or while inside the elevator, the transport vehicle 100 sends an automatic leaving request to the control system 200, the automatic leaving request comprising a ride ending position such as the $5^{th}$ floor, so that the elevator moves to the $5^{th}$ floor. When the elevator arrives at the $5^{th}$ floor, the transport vehicle 100 automatically leaves the elevator.

Figure 4:
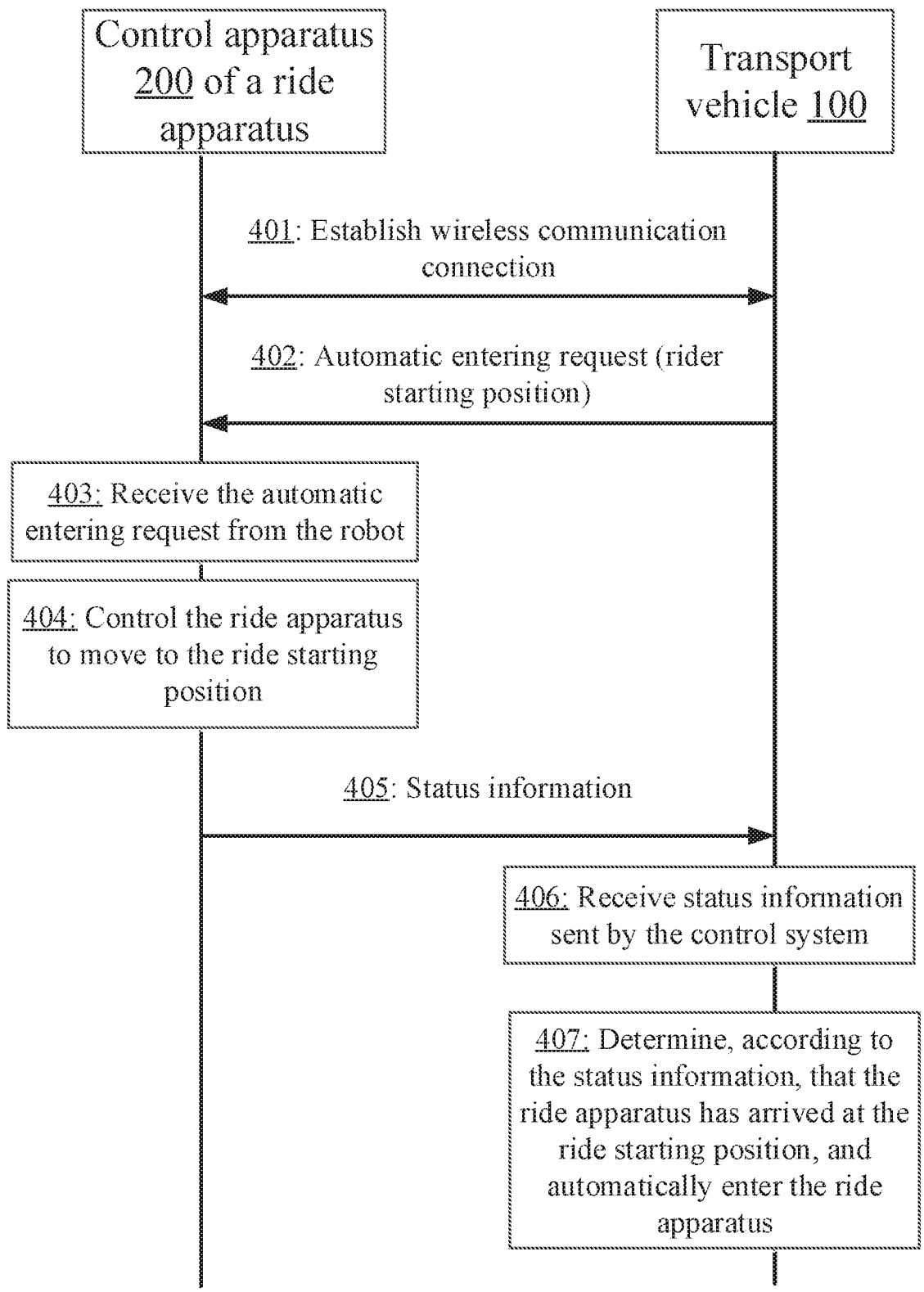
FIG. 4 is a flow chart of a method for automatically entering a ride apparatus consistent with the exemplary embodiments of the present disclosure.

An example method for automatically entering a ride apparatus is shown in FIG. 4, and the method may comprise the following steps.

S401: a transport vehicle 100 establishes wireless communication connection with a control system 200 of a ride apparatus.

To enable the transport vehicle 100 to control the ride apparatus and to achieve automatic entering, the transport vehicle can establish wireless communication connection with the control system 200 of the ride apparatus. In some embodiments, the transport vehicle 100 may initiate the communication connection. For example, the transport vehicle detects an access point of the control system and sends an access request to the access point. Alternatively, the control system of the ride apparatus may initiate the communication connection, which is not limited by embodiments of the present disclosure. When the wireless communication connection is established, data interaction may be achieved between the transport vehicle 100 and the control system 200 of the ride apparatus based on the wireless communication connection.

Here, the transport vehicle 100 and the control system 200 of the ride apparatus may establish wireless communication connection using any wireless communication technology, such as Bluetooth, ultra-wide band, ZigBee, Wireless Local Area Networks (Wi-Fi), Near Field Communication, etc. In an example that the ride apparatus is an elevator, an access point of the elevator control system may be provided close to the elevator entrance on each floor, and the transport vehicle accesses, according to the floor that it is on, a corresponding access point by wireless communication, such as Bluetooth. For example, when the transport vehicle is on the Pt floor, it enters a designated waiting position and accesses the access point disposed at the elevator entrance of the Pt floor. If the transport vehicle 100 fails to establish wireless communication connection with the control system 200 of the ride apparatus, for example, the transport vehicle fails to access the access point arranged at the elevator entrance of the Pt floor, the transport vehicle 100 may send a troubleshooting request to the control system 400 of the transport vehicle. Upon receiving the troubleshooting request, the control system 400 of the transport vehicle performs a fault analysis. For example, the corresponding fault may be eliminated manually.

S402: the transport vehicle 100 sends, based on the wireless communication connection, an automatic entering request to the control system 200.

For example, when the wireless communication connection is established, the transport vehicle 100 may send, based on the established wireless communication connection, an automatic entering request to the control system 200 of the ride apparatus. Here, the automatic entering request carries a ride starting position that is used to instruct the ride apparatus to move to the ride starting position.

S403: the control system 200 receives, based on the wireless communication connection, the automatic entering request from the transport vehicle 100.

S404: the control system 200 controls the ride apparatus to move to the ride starting position.

Upon receiving the automatic entering request, the control system 200 acquires the ride starting position in the automatic entering request and controls the ride apparatus to move to the ride starting position, for example, to the floor where the transport vehicle waits to enter the elevator. Here, if the control system 200 successfully controls the ride apparatus to move to the ride starting position, it may send a success message to the transport vehicle 100; otherwise, it may send a failure message to the transport vehicle 100. If the transport vehicle 100 receives the failure message, it may send a troubleshooting request to the control system 400 of the transport vehicle.

Here, if the ride apparatus has a door capable of controlling the open/close status, the control system 200 controls the ride apparatus to be in the open-door status after the ride apparatus arrives at the ride starting position, such that the transport vehicle 100 can automatically enter the ride apparatus. For example, upon receiving the automatic entering request, the elevator control system controls the elevator to move to the ride starting position, and when the elevator arrives at the ride starting position, controls the elevator to be in the open-door status.

In some embodiments, a variety of reasons may prevent the transport vehicle 100 from smoothly entering the ride apparatus. For example, the transport vehicle may stay for a period of time after the elevator door is opened, giving passengers a priority to take the elevator, and consequently, the transport vehicle may not be able to enter the elevator within a prescribed time corresponding to the open-door status. For another example, when a passenger enters the elevator, he/she may press a closing button to close the elevator door before the transport vehicle 100 enters. To ensure a smooth entering of the transport vehicle, therefore, a delayed closing function of the ride apparatus may be provided.

For example, after the ride apparatus arrives at the ride starting position and is in an open-door status, the control system 200 controls the ride apparatus to be in a delayed closing status. When the ride apparatus is in the delayed closing status, the manual closing button of the ride apparatus (e.g., door close buttons in an elevator) is disabled for a third predetermined time. In other words, within the third predetermined time, the ride apparatus will not switch to a closed-door status even if a passenger or other external forces manually trigger the closing button. When the transport vehicle 100 enters the ride apparatus, it sends a closing request to the control system 200, and the control system 200 controls the ride apparatus to switch to the closed-door status, thereby ensuring a smooth entering by the transport vehicle 100. Alternatively, after the third predetermined time, the ride apparatus can switch to the closed-door status according to manual triggering of the closing button.

The word "third" in the "third predetermined time" is only used to differentiate various predetermined times, and does not pose any limitation, such as a sequential order.

S405: the control system 200 sends, based on the wireless communication connection, status information to the transport vehicle 100.

Here, the control system 200 may send status information to the transport vehicle 100 by various methods. For example, when detecting that the ride apparatus has arrived at the ride starting position, the control system 200 may generate status information and send the generated status information to the transport vehicle 100. Alternatively, the control system 200 may receive a status check request from the transport vehicle 100, the status check request requesting the control system 200 to send status information of the ride apparatus. The control system 200 sends the status information to the transport vehicle 100 according to the status check request.

S406: the transport vehicle 100 receives, based on the wireless communication connection, status information sent by the control system 200.

S407: the transport vehicle 100 determines, according to the status information, that the ride apparatus has arrived at the ride starting position, and automatically enters the ride apparatus.

When the transport vehicle 100 determines, according to the received status information, that the ride apparatus has arrived at the ride starting position, it indicates that the conditions for automatic entering have been satisfied. Therefore, the transport vehicle 100 automatically enters the ride apparatus. Here, when the ride apparatus has a door capable of controlling the open/close status and before automatically entering the ride apparatus, the method may further comprise that: the transport vehicle determines, according to the status information, that the ride apparatus is in an open-door status.

If the transport vehicle determines, according to the status information, that the ride apparatus has not arrived at the ride starting position or is not in an open-door status (when comprising a door capable of controlling the open/close status), the transport vehicle 100 may repeatedly check if the ride apparatus satisfies the conditions for automatic entering. For example, the transport vehicle may repeatedly check if the elevator arrives at the $1^{st}$ floor and is in an open-door status, and automatically enter when the conditions for automatic entering are satisfied. For example, the method further comprises: if the transport vehicle determines, according to the status information, that the ride apparatus has not arrived at the ride starting position, the transport vehicle resends a status check request after a fourth predetermined time.

The word "fourth" in the "fourth predetermined time" is only used to differentiate various predetermined times, and does not pose any limitation, such as a sequential order.

As such, a transport vehicle 100 establishes wireless communication connection with a control system 200 of the ride apparatus, and uses the wireless communication connection to send an automatic entering request to the control system 200, wherein the automatic entering request carries a ride starting position, such that the control system controls the ride apparatus to move to the ride starting position. If the transport vehicle 100 determines, according to the status information sent by the control system 200, that the ride apparatus has arrived at the ride starting position, it automatically enters the ride apparatus. Thus, the disclosed method for automatic control of a ride tool by a transport vehicle can achieve automatic rides and eliminate the need for manual operations to save manpower and material resources.

In one embodiment, to prevent hindering passengers from entering the ride apparatus, the transport vehicle may stay at its position for a period of time after determining that the ride apparatus has arrived at the ride starting position, and then executing the automatically entering the ride apparatus. Before the transport vehicle 100 enters the ride apparatus, it may encounter an obstacle, such as a mobile obstacle (e.g., a passenger) or an immobile obstacle (e.g., a wall). To prevent injuring the passengers or damaging the ride apparatus and to improve safety, the transport vehicle 100 may acquire, before automatically entering the ride apparatus and according to the position of the obstacle, a movement route for automatically entering the ride apparatus, i.e., a movement route that can avoid the obstacle. The transport vehicle 100 automatically enters the ride apparatus according to the movement route. Due to the obstruction by the obstacle, the transport vehicle 100 may not be able to calculate a feasible movement route. Since an obstacle may be a mobile obstacle, e.g., a passenger, the mobile obstacle may be caused to avoid the transport vehicle by voice prompt. For example, the transport vehicle 100 determines if a movement route for automatically entering the ride apparatus can be acquired; if no, the transport vehicle 100 provides a voice prompt. When the transport vehicle 100 determines that the obstacle has moved, it recalculates a movement route according to the position of the obstacle after the movement. For example, when the transport vehicle needs to enter an elevator, passengers gather around the elevator entrance, making it impossible for the transport vehicle to obtain a movement route for entering the elevator. The transport vehicle may play a voice prompt to ask the passengers to give room, such that the transport vehicle can acquire a movement route.

Since transport vehicles may be big in size and a ride apparatus has a limited capacity, the ride apparatus may not be able to carry a plurality of transport vehicles when they need to ride the ride apparatus at the same time. Therefore, a pairing-lock (referred to as "pairing" or "locking") may be set between transport vehicles and the ride apparatus. A transport vehicle can only enter the ride apparatus after setting up the pairing with the ride apparatus. When the transport vehicle leaves the ride apparatus, the pairing-lock is released. A transport vehicle that is not pairing-locked with the ride apparatus cannot take the ride apparatus.

For example, before automatically entering, the transport vehicle 100 sends a locking request to the control system 200 of the ride apparatus and requests to establish a locking relationship with the ride apparatus. Upon receiving the locking request, the control system 200 determines, according to the identification of the ride apparatus to be locked that is carried in the locking request, if the number of transport vehicles that have established a locking relationship with the ride apparatus corresponding to the ride apparatus identification is smaller than a preset threshold. If it is smaller than the preset threshold, it indicates that there is a relatively small number of transport vehicles that are currently or to be carried by the ride apparatus. Therefore, a locking instruction is sent to the transport vehicle 100 that initiates the locking request. Upon receiving the locking instruction, the transport vehicle 100 automatically enters the ride apparatus. If it is not smaller than the preset threshold, it indicates that there is a relatively large number of transport vehicles that are currently or to be carried by the ride apparatus. Therefore, a locking instruction may not be sent to the transport vehicle 100, or a locking failure instruction may be sent to the transport vehicle 100. The transport vehicle 100 resends the locking request after a predetermined time, or may execute the next task. Here, the preset threshold may be set according to the size of the transport vehicle 100 and the capacity of the ride apparatus. For example, the preset threshold is set to 1, indicating that the ride apparatus can take at most one transport vehicle at a time.

Since the ride apparatus has a limited capacity, a current capacity of the ride apparatus may be determined before the transport vehicle 100 automatically enters the ride apparatus.

For example, the transport vehicle 100 determines if a current load number of the ride apparatus is smaller than a preset threshold; if yes, it indicates that the current capacity of the ride apparatus is sufficient to accommodate the transport vehicle 100, and the automatically entering the ride apparatus is executed. For example, if the current load number is smaller than 8, the transport vehicle 100 automatically enters the elevator. If no, it indicates that the current capacity of the ride apparatus is insufficient to accommodate the transport vehicle 100, and the automatic entering request is resent after a first predetermined time. For example, if the current load number is greater than 8, the transport vehicle 100 will not immediately enter the elevator, but the automatic entering request is resent after a certain period of time, e.g., after the elevator has left.

Here, the current load number may be obtained by imaging. For example, a photo of the inside of the ride apparatus may be taken by a camera arranged on the transport vehicle 100, and the current load number of the ride apparatus is obtained by analyzing the photo of the inside of the ride apparatus. For example, when the transport vehicle determines that the elevator has arrived at the ride starting position, it takes a photo of the inside of the elevator after a certain period of time and calculates the current load number of the elevator.

The word "first" in the "first predetermined time" is only used to differentiate various predetermined times, and does not pose any limitation, such as a sequential order.

In some embodiments, the transport vehicle 100 detects an abnormal status during the process of automatic entering. For example, the abnormal status may comprise any one or more of the following statuses: the transport vehicle fails to establish wireless communication connection with the control system of a ride apparatus, and the transport vehicle fails to receive status information sent by the control system. At this time, the transport vehicle 100 may send a troubleshooting request to the control system 400 of the transport vehicle. The troubleshooting request indicates that the transport vehicle 100 detects an abnormal status. Upon receiving the troubleshooting request, the control system 400 of the transport vehicle performs fault analysis and processing. For example, the corresponding fault may be eliminated manually.

During automatic riding, the transport vehicle 100 needs to maintain good communications with the control system 200 of the ride apparatus. After the transport vehicle 100 enters the ride apparatus, the internal communication quality may be affected due to the closure of the ride apparatus, which may even affect the communication between the transport vehicle 100 and the control system 200, and make it difficult for the transport vehicle 100 to complete the automatic riding. Therefore, the control system 200 of the ride apparatus may be provided with an internal access point inside the ride apparatus and an external access point outside the ride apparatus. When the transport vehicle 100 does not enter the ride apparatus, it is connected with the external access point of the control system 200; when the transport vehicle 100 enters the ride apparatus, it is connected with the internal access point of the control system 200, i.e., switched from the external access point to the internal access point. For example, establishing the wireless communication connection by the transport vehicle 100 with the control system 200 of the ride apparatus in S401 comprises that: the transport vehicle 100 establishes wireless communication connection with the external access point. Therefore, the provision of an internal access point and an external access point overcomes the issue of poor communication quality inside the ride apparatus, and sufficiently ensures the communication quality between the transport vehicle and the control system.

Here, if the transport vehicle 100 fails to establish wireless communication connection with the internal access point, it will not be able to continue data transmission with the control system 200, and will not be able to arrive at the ride ending position of the transport vehicle 100. As a result, the transport vehicle 100 automatically leaves the ride apparatus. After automatically leaving the ride apparatus, moreover, the transport vehicle 100 may send a troubleshooting request to the control system 400 of the transport vehicle. Upon receiving the troubleshooting request, the control system 400 of the transport vehicle performs fault analysis. For example, if the transport vehicle is on the 1$^{st}$ floor, the current floor task is cancelled and the next floor task will be executed; if the transport vehicle is on another floor, it will stay at its current location for help.

After the transport vehicle 100 automatically enters the ride apparatus or the transport vehicle 100 has established wireless communication connection with the internal access point, it can either wait for the ride apparatus to automatically switch to a closed-door status or send a closing request to the control system 200 of the ride apparatus, such that the ride apparatus is switched to the closed-door status. If the ride apparatus cannot switch to the closed-door status, the transport vehicle 100 will receive a door closing failure message from the control system 200 of the ride apparatus, and the transport vehicle 100 may send a troubleshooting request to the control system 400 of the transport vehicle.

Figure 5:
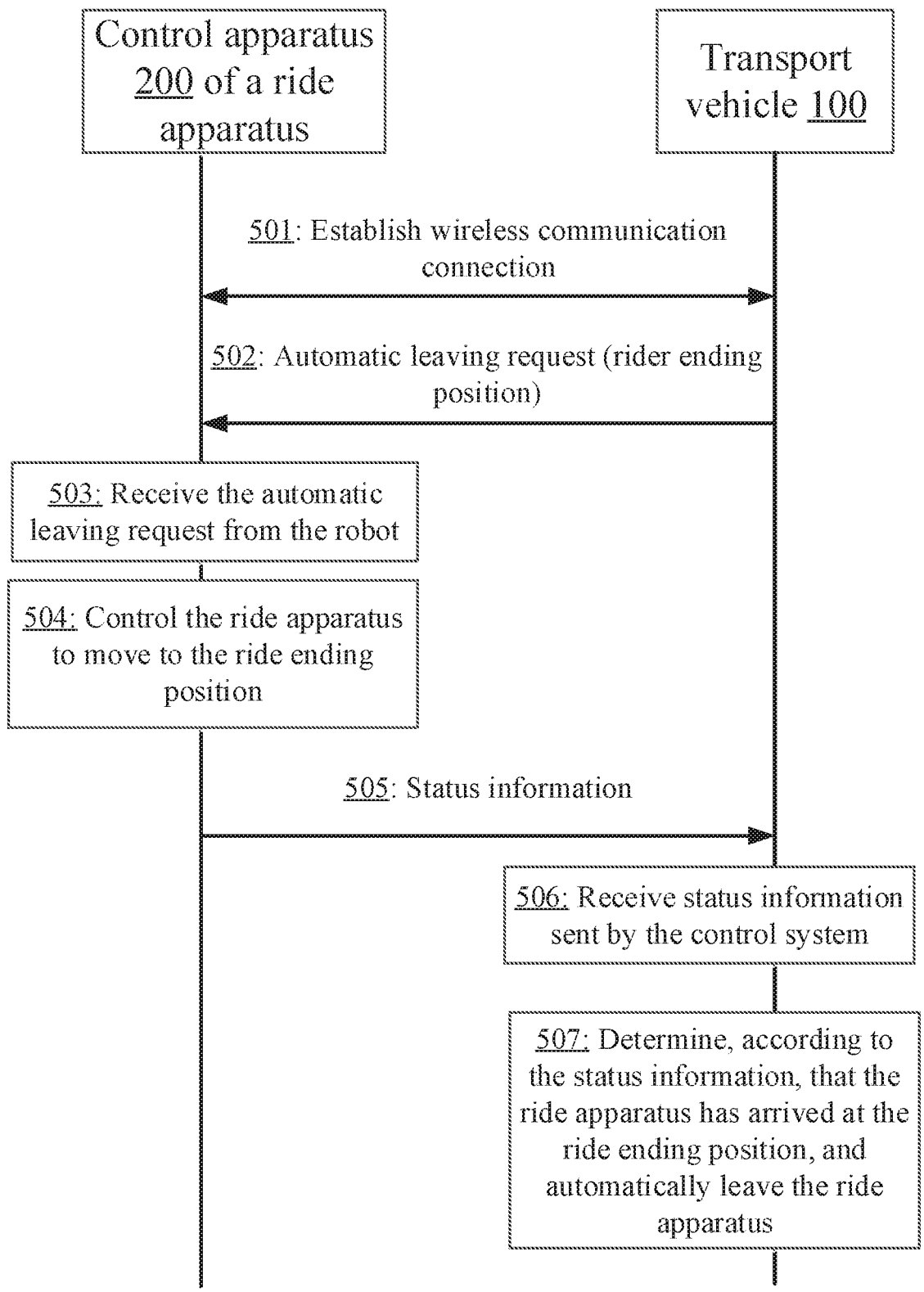
FIG. 5 is a flow chart of a method for automatically leaving a ride apparatus consistent with the exemplary embodiments of the present disclosure.

An example method for automatically leaving a ride apparatus is shown in FIG. 5, and the method comprises the following steps.

S501: a transport vehicle 100 establishes wireless communication connection with a control system 200 of the ride apparatus.

In an example that the ride apparatus is an elevator, the transport vehicle may establish a connection with the elevator control system, and maintain the connection after entering the elevator. When the elevator control system is provided with an elevator external access point and an elevator internal access point, the transport vehicle may be connected with the external access point before entering the elevator, and after entering the elevator, it is switched from the external access point to the internal access point for connection.

The relevant content of the step S301 in the above embodiment may be referenced for this step, which will not be repeated herein.

S502: the transport vehicle 100 sends, based on the wireless communication connection, an automatic leaving request to the control system 200.

After the wireless communication connection is established, the transport vehicle 100 may send, based on the established wireless communication connection, an automatic leaving request to the control system 200 of the ride apparatus.

Here, the automatic leaving request carries a ride ending position used to instruct the elevator to move to the ride ending position. The automatic leaving request may be sent before the transport vehicle enters the ride apparatus. For example, before entering the elevator, the transport vehicle sends an automatic riding request that comprises an automatic entering request and an automatic leaving request. The automatic entering request carries a ride starting position and the automatic leaving request carries a ride ending position. The automatic leaving request may also be sent after the transport vehicle enters the elevator. For example, after entering the elevator, the transport vehicle sends an automatic leaving request that carries a ride ending position to the elevator control system.

S503: the control system 200 receives, based on the wireless communication connection, the automatic leaving request from the transport vehicle 100.

S504: the control system 200 controls the ride apparatus to move to the ride ending position.

For example, after the transport vehicle enters the elevator, the control system 200 controls the elevator to move to the ride ending position, e.g., the 5$^{th}$ floor.

Upon receiving the automatic leaving request, the control system 200 acquires the ride ending position in the automatic leaving request and controls the ride apparatus to move to the ride ending position, for example, to the floor where the transport vehicle leaves the elevator. Here, if the control system 200 successfully controls the ride apparatus to move to the ride ending position, it may send a call success message to the transport vehicle 100; otherwise, it may send a call failure message to the transport vehicle 100. If the transport vehicle 100 receives the call failure message, it may send a troubleshooting request to the control system 300 of the transport vehicle.

Here, if the ride apparatus has a door capable of controlling the open/close status, the control system 200 controls the ride apparatus to be in the open-door status after the ride apparatus arrives at the ride ending position, such that the transport vehicle 100 can automatically leave the ride apparatus.

To ensure a smooth leaving of the transport vehicle, therefore, a delayed closing function of the ride apparatus may be provided. For example, after the ride apparatus arrives at the ride ending position and is in an open-door status, the control system 200 controls the ride apparatus to be in a delayed closing status. When the ride apparatus is in a delayed closing status, the manual closing button of the ride apparatus is disabled for a third predetermined time. When the transport vehicle 100 automatically leaves the ride apparatus, it sends a closing request to the control system 200, and the control system 200 controls the ride apparatus to switch to the closed-door status, thereby ensuring a smooth ride of the transport vehicle 100. Alternatively, after the third predetermined time, the ride apparatus can switch to the closed-door status according to manual triggering of the closing button.

S505: the control system 200 sends, based on the wireless communication connection, status information to the transport vehicle 100.

The control system 200 may send status information after detecting that the ride apparatus has arrived at the ride ending position. Alternatively, the transport vehicle 100 sends a status check request to the control system 200, and receives the status information returned by the control system 200. For example, after the transport vehicle enters the elevator, it sends a floor check request to the elevator control system, finds out the current floor according to the floor information, and determines if the ride apparatus has arrived at the ride ending position. If no, the transport vehicle resends the floor check request; if yes, the transport vehicle can send a door opening check request, receive an open-door status returned by the control system 200, and determine if the door is open. If no, the transport vehicle can determine if the time is exceeded. If the time is exceeded, the transport vehicle may send a troubleshooting request to the control system 300 of the transport vehicle; if the time is not exceeded, the transport vehicle may resend the door opening check request.

S506: the transport vehicle 100 receives, based on the wireless communication connection, status information sent by the control system 200.

S507: the transport vehicle 100 determines, according to the status information, that the ride apparatus has arrived at the ride ending position, and automatically leaves the ride apparatus.

When the transport vehicle 100 determines, according to the received status information, that the ride apparatus has arrived at the ride ending position, it indicates that the conditions for automatic leaving have been satisfied. Therefore, the transport vehicle 100 automatically leaves the ride apparatus. Here, when the ride apparatus has a door capable of controlling the open/close status and before the transport vehicle automatically leaving the ride apparatus, the method may further comprise that: the transport vehicle determines, according to the status information, that the ride apparatus is in an open-door status.

If the transport vehicle determines, according to the status information, that the ride apparatus has not arrived at the ride starting position or is not in an open-door status, the transport vehicle 100 may repeatedly check if the ride apparatus satisfies the conditions for automatic leaving. For example, the method further comprises that: if the transport vehicle determines, according to the status information, that the ride apparatus has not arrived at the ride ending position, the transport vehicle resends the status check request after a fourth predetermined time.

As described, a transport vehicle 100 establishes wireless communication connection with a control system 200 of the ride apparatus, and uses the wireless communication connection to send an automatic leaving request to the control system 200, wherein the automatic leaving request carries a ride ending position, such that the control system controls the ride apparatus to move to the ride ending position. If the transport vehicle 100 determines, according to the status information sent by the control system 200, that the ride apparatus has arrived at the ride ending position, it automatically leaves the ride apparatus. Thus, the disclosed method for automatic control of a ride tool by a transport vehicle can achieve automatic rides and eliminate the need for manual operations so as to save manpower and material resources.

In one embodiment, to prevent hindering passengers from leaving the ride apparatus, the transport vehicle may stay for a period of time after determining that the ride apparatus has arrived at the ride ending position, and then executing the automatically leaving the ride apparatus. Before automatically leaving the ride apparatus, the transport vehicle 100 may acquire, according to the position of an obstacle, a movement route for automatically leaving the ride apparatus, e.g., a movement route that can avoid the obstacle. The transport vehicle 100 automatically leaves the ride apparatus according to the movement route. Due to the obstruction by the obstacle, the transport vehicle 100 may not be able to calculate a feasible movement route. Since an obstacle may be a mobile obstacle, e.g., a passenger, the mobile obstacle may be cautioned avoid the transport vehicle by voice prompt. For example, the transport vehicle performs obstacle detection. If no obstacle is detected, it indicates that a movement route for automatically leaving the elevator can be acquired, and the transport vehicle automatically leaves the elevator. If an obstacle is detected, it determines if the time is exceeded. If no, it indicates that the elevator has not yet left the current floor and a voice prompt is provided. If yes, it indicates that the elevator has left the current floor. Therefore, the automatic leaving request is resent after a predetermined time to instruct the elevator to return to the floor.

In some embodiments, the transport vehicle 100 may perform operations like avoiding passengers and planning routes before leaving the ride apparatus, and may not be able to leave the ride apparatus within a prescribed time, i.e., when the ride apparatus stays at the ride ending position. Therefore, in the case where the transport vehicle 100 cannot leave the ride apparatus, the transport vehicle 100 resends the automatic leaving request to the control system of the ride apparatus after a predetermined time. For example, after the ride apparatus arrives at the ride ending position, and if the transport vehicle cannot leave the ride apparatus when the ride apparatus leaves the ride ending position, the transport vehicle resends the automatic leaving request after a second predetermined time. Upon receiving the automatic leaving request, the control system 200 of the ride apparatus controls the ride apparatus to move to the ride ending position again. For example, the transport vehicle takes the elevator on the $1^{st}$ floor and needs to arrive on the $5^{th}$ floor. When the elevator arrives on the $5^{th}$ floor and is in the open-door status, the transport vehicle cannot leave the elevator during the open-door status. The elevator leaves the $5^{th}$ floor and moves to another floor. At this time, the transport vehicle may resend the automatic leaving request after a predetermined time to cause the elevator to move to the $5^{th}$ floor again, such that the transport vehicle leaves the elevator when the elevator arrives on the $5^{th}$ floor.

The word "second" in the "second predetermined time" is only used to differentiate various predetermined times, and does not pose any limitation, such as a sequential order.

Since the transport vehicle 100 can be locked with the ride apparatus before automatically entering the ride apparatus, the lock may be correspondingly released when the transport vehicle 100 leaves the ride apparatus. For example, the transport vehicle sends a lock releasing request to the control system 300 of the transport vehicle to release the prior lock between the transport vehicle 100 and the ride apparatus, facilitating subsequent locking by other transport vehicles with the ride apparatus.

Optionally, after successfully leaving the ride apparatus, the transport vehicle 100 sends a leaving confirmation instruction to the control system 200 of the ride apparatus. Upon receiving the leaving confirmation instruction, the control system 200 returns confirmed status information to the transport vehicle 100. If the transport vehicle 100 determines that the received confirmed status information indicates a correct status, it may release the lock with the ride apparatus; otherwise, it may send a fault recording request to the control system 300 of the transport vehicle.

It is possible that the transport vehicle 100 detects an abnormal status during the process of automatic leaving. For example, the abnormal status may comprise any one or more of the following statuses: the transport vehicle fails to establish wireless communication connection with the control system of a ride apparatus, and the transport vehicle fails to receive status information sent by the control system. At this time, the transport vehicle 100 may send a troubleshooting request to the control system 300 of the transport vehicle. The troubleshooting request indicates that the transport vehicle 100 detects an abnormal status. Upon receiving the troubleshooting request, the control system 300 of the transport vehicle performs fault analysis. For example, the corresponding fault may be eliminated manually.

Referring to FIG. 6, an example troubleshooting method is provided, and the method comprises the following step.

S601: a control system of a transport vehicle receives a troubleshooting request from the transport vehicle, and the troubleshooting request indicates that the transport vehicle detects an abnormal status.

Here, the abnormal status comprises any one or more of the following statuses: the transport vehicle fails to establish wireless communication connection with the control system of a ride apparatus, and the transport vehicle fails to receive status information sent by the control system of the ride apparatus.

The relevant contents of the embodiments corresponding to FIG. 3 and FIG. 5 may be referenced for details of the present embodiment, which will not be repeated herein.

Referring to FIG. 7, an example method for controlling a ride apparatus is provided, and the method may comprise the following steps.

S701: a portable apparatus establishes wireless communication connection with a control system of the ride apparatus.

The portable apparatus may comprise a mobile electronic apparatus, e.g., a cell phone, a laptop computer, a pad, etc. Here, the portable apparatus may establish wireless communication connection with the control system of the ride apparatus before or after entering the ride apparatus, which is not limited in embodiments of the present disclosure. With respect to detailed information of the establishing method, the examples in which a transport vehicle establishes wireless communication connection with a control system in the above description may be referenced.

S702: the portable apparatus sends, based on the wireless communication connection, a status control request to the control system, and the status control request is used to request the control system to control the current status of the ride apparatus.

After establishing the wireless communication connection with the control system of the ride apparatus, the portable apparatus may send, based on the wireless communication connection, a status control request to the control system, and upon receiving the status control request, the control system controls the current status of the ride apparatus based on the request.

Here, when the status control request carries an indicated riding position, the control request may be used to request the control system to control the ride apparatus to move to the indicated riding position. For example, the control system controls the ride apparatus to move to the ride starting position or the ride ending position; alternatively, when the ride apparatus has a door capable of controlling the open/close status, the control request may be used to request the control system to control the ride apparatus to maintain the open-door status or switch to the closed-door status.

For example, when the ride apparatus is an elevator and a passenger is about to arrive at the elevator entrance on the Pt floor, a cell phone may be operated to establish a wireless communication connection with a control system of the elevator, and send, based on the established wireless communication connection, a status control request to the control system. The status control request may indicate the ride starting position of the passenger, i.e., the Pt floor, and then the elevator is controlled to move to the Pt floor, and furthermore, the elevator may be controlled to maintain the open-door status when arriving on the Pt floor. Moreover, the status control request may also indicate the ride ending position of the passenger, e.g., the 5$^{th}$ floor, and after the passenger enters the elevator, the elevator is controlled to move to the 5$^{th}$ floor.

Corresponding to the above method embodiments, the present disclosure provides corresponding hardware device embodiments, which will be described in detail below.

Figure 8:
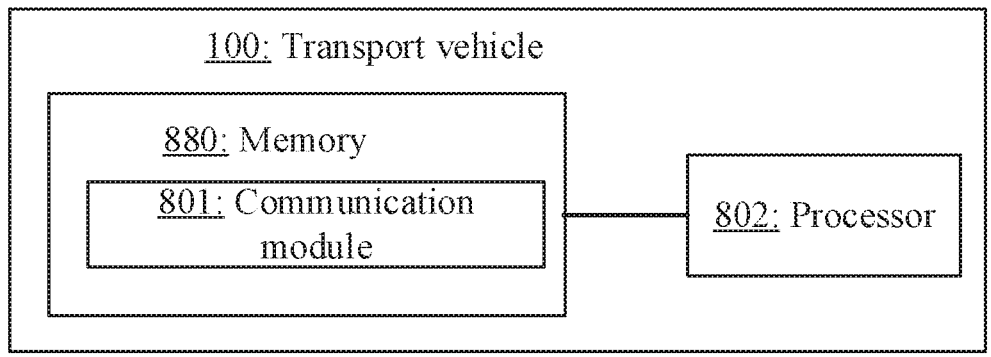
FIG. 8 is a structural schematic diagram of a transport vehicle consistent with the exemplary embodiments of the present disclosure.

Referring to FIG. 8, an example transport vehicle 100 is disclosed. The transport vehicle 100 may comprise a processor 802 and a memory 880 storing instructions that when executed by the processor 802, cause the transport vehicle 100 to perform various steps and methods described herein. The memory 880 may be non-transitory and computer-readable, and the stored instructions may comprise a communication module 801. The processor 802 is coupled with the memory 880.

The communication module 801 is configured to establish wireless communication connection with a control system 200 of a ride apparatus.

The processor 802 is configured to carry out various methods and steps described above with reference to the transport vehicle 100, including the method embodiments of automatically entering a ride apparatus according to the embodiments of the present invention and the method embodiments of automatically leaving a ride apparatus.

For example, for entering a ride apparatus, the processor 802 is configured to establish wireless communication connection with a control system 200 of the ride apparatus via executing the communication module 801; send, based on the wireless communication connection, an automatic entering request to the control system 200, the automatic entering request carrying a ride starting position; receive, based on the wireless communication connection, status information sent by the control system 200; determine, according to the status information, that that the ride apparatus has arrived at the ride starting position, and control the transport vehicle 100 to automatically enter the ride apparatus.

For example, for leaving a ride apparatus, the processor 802 is configured to establish wireless communication connection with a control system 200 of the ride apparatus via executing the communication module 801; send, based on the wireless communication connection, an automatic leaving request to the control system 200, the automatic leaving request carrying a ride ending position; receive, based on the wireless communication connection, status information sent by the control system 200; determine, according to the status information, that that the ride apparatus has arrived at the ride ending position, and control the transport vehicle 100 to automatically leave the ride apparatus.

Optionally, the processor 802 may comprise a Central Processing Unit (CPU), an Application Specific Integrated Circuit (ASIC), or one or more integrated circuits.

The modules of the transport vehicle 100 may be based on the method embodiment shown in FIG. 4 or FIG. 5, wherein definitions and descriptions of the terms are consistent with those in the method embodiment shown in FIG. 4 or FIG. 5 and will not be repeated herein.

Figure 9:
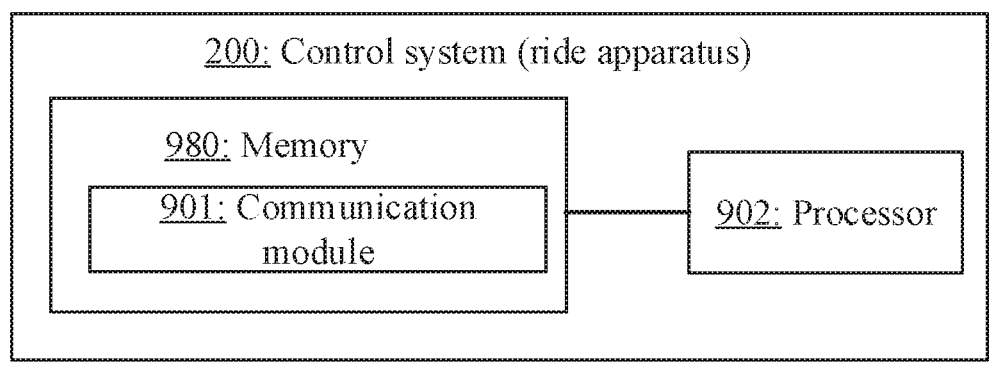
FIG. 9 is a structural schematic diagram of a control system of a ride apparatus consistent with the exemplary embodiments of the present disclosure.

Referring to FIG. 9, an example control system 200 of a ride apparatus is disclosed. The control system 200 may comprise a processor 902 and a memory 980 storing instructions that when executed by the processor 902, cause the control system 200 to perform various steps and methods described herein. The memory 980 may be non-transitory and computer-readable, and the stored instructions may comprise a communication module 901. The processor 902 is coupled with the memory 980.

The communication module 901 is configured to establish wireless communication connection with a transport vehicle 100.

The processor module 902 is configured to carry out various methods and steps described above with reference to the control system 200, including the method embodiments of automatically entering a ride apparatus according to the embodiments of the present invention, and the method embodiments of automatically leaving a ride apparatus according to the embodiments of the present invention.

For example, the processor 902 is configured to establish wireless communication connection with a transport vehicle 100 via executing the communication module 901; receive, based on the wireless communication connection, an automatic entering request from the transport vehicle 100, the automatic entering request carrying a ride starting position; control the ride apparatus to move to the ride starting position; send, based on the wireless communication connection, status information to the transport vehicle 100, the status information indicating that the ride apparatus has arrived at the ride starting position.

For example, the processor 902 is configured to establish wireless communication connection with a transport vehicle 100 via the communication module 901; receive, based on the wireless communication connection, an automatic leaving request from the transport vehicle 100, the automatic leaving request carrying a ride ending position; control the ride apparatus to move to the ride ending position; send, based on the wireless communication connection, status information to the transport vehicle 100, the status information indicating that the ride apparatus has arrived at the ride ending position.

Optionally, the processor module 902 may comprise a Central Processing Unit (CPU), an Application Specific Integrated Circuit (ASIC), or one or more integrated circuits.

The modules of the control system 200 of the ride apparatus may be based on the method embodiment shown in FIG. 4 or FIG. 5, wherein definitions and descriptions of the terms are consistent with those in the method embodiment shown in FIG. 4 or FIG. 5 and will not be repeated herein.

Figure 10:
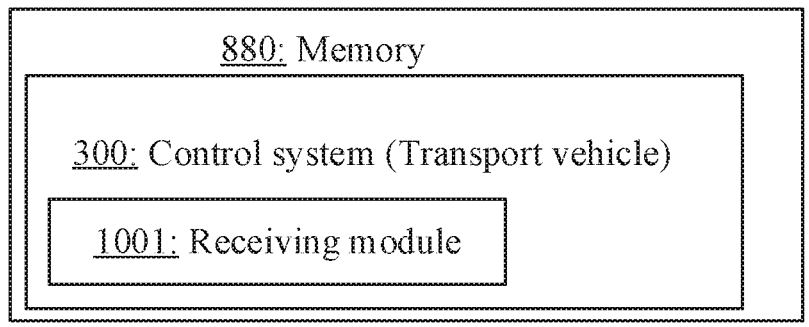
FIG. 10 is a structural schematic diagram of a control system of a transport vehicle consistent with the exemplary embodiments of the present disclosure.

Referring to FIG. 10, an example control system 300 of a transport vehicle is disclosed. The control system 300 may include software instructions that are stored in the memory 880 described above. The control system 300 may comprise a receiving module 1001.

The receiving module 1001 is configured to receive a troubleshooting request from the transport vehicle 100, and the troubleshooting request indicates that the transport vehicle detects an abnormal status; wherein the abnormal status comprises any one or more of the following statuses: the transport vehicle 100 fails to establish wireless communication connection with the control system 200 of a ride apparatus, and the transport vehicle 100 fails to receive status information sent by the control system 200 of the ride apparatus.

The modules of the control system 300 may be configured to perform the method embodiment shown in FIG. 6, wherein definitions and descriptions of the terms are consistent with those in the method embodiment shown in FIG. 6 and will not be repeated herein.

Figure 11:
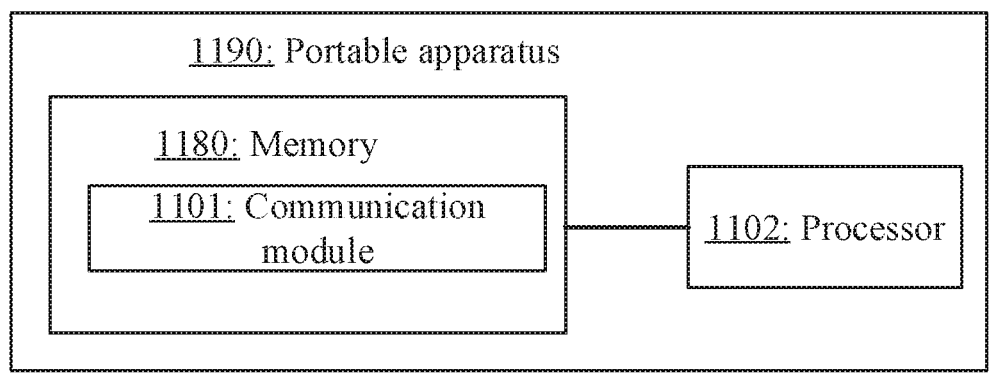
FIG. 11 is a structural schematic diagram of a portable apparatus consistent with the exemplary embodiments of the present disclosure.

Referring to FIG. 11, an example portable apparatus 1190 is disclosed. The portable apparatus 1190 may comprise a processor 1102 and a memory 1180 storing instructions that when executed by the processor 1102, cause the portable apparatus 1190 to perform various steps and methods described herein. The memory 1180 may be non-transitory and computer-readable, and the stored instructions may comprise a communication module 1101. The processor module 1102 is coupled with the memory 1180.

The communication module 1101, when executed by processor module 1102, is configured to establish wireless communication connection with a control system 200 of a ride apparatus.

The processor module 1102 is configured to carry out any method embodiment of the method for controlling a ride apparatus according to the embodiments of the present invention. For example, the processor module 1102 is configured to establish wireless communication connection with a control system 200 of a ride apparatus via executing the communication module 1101; send, based on the wireless communication connection, a status control request to the control system, the status control request being used to request the control system to control the running status of the ride apparatus.

Optionally, the processor module 1102 may comprise a Central Processing Unit (CPU), an Application Specific Integrated Circuit (ASIC), or one or more integrated circuits.

The modules of the portable apparatus may be based on the method embodiment shown in FIG. 7, wherein definitions and descriptions of the terms are consistent with those in the method embodiment shown in FIG. 7 and will not be repeated herein.

A person skilled in the art shall clearly understand that, for ease and conciseness of the description, an operating process of the above-described systems, devices and units may refer to corresponding processes in the above method embodiments, and will not be repeated herein.

In the embodiments of the present disclosure, it should be understood that the disclosed systems, devices and methods may be implemented in other manners. For example, the above-described device embodiments are only exemplary. For example, the unit division may be a division of logic functions, and other manners of division may be used in practical implementations. For example, a plurality of units or assemblies may be combined or integrated into another system, or some features may be omitted or not executed. Moreover, the displayed or discussed mutual coupling, direct coupling or communication connection may be indirect coupling or communication connection through some interfaces, devices or units, which may be in an electric, mechanic or other form.

The units described as separate parts may or may not be physically separate, and the parts displayed as units may or may not be physical units, namely, they can be arranged at one location, or distributed over a plurality of network units. Some or all of the units may be selected, according to actual needs, to achieve the goals of the solutions of the embodiments.

Furthermore, functional units in the embodiments of the present disclosure may be integrated into one processing unit, or each unit may exist as an independent physical unit, or two or more units may be integrated into one unit. The above integrated units may be implemented either in a hardware form or in a form of software functional units.

If the integrated units are implemented in a form of software functional units and sold or used as independent products, they may be stored in a computer readable storage medium. Based on such an understanding, the modules described above may be embodied in the form of a software product. The computer software product is stored in a storage medium, which includes several instructions to enable a computer apparatus (which may be a personal computer, a server, or a network device) to execute all or some steps of the methods set forth above. The above-described medium includes various media capable of storing program codes, such as flash drive, portable hard drive, Read-Only Memory (ROM), Random Access Memory (RAM), magnetic disk, and optical disk.

As described above, the embodiments are only used to describe, rather than limit, the technical solution of the present disclosure. In view of the detailed description, a person skilled in the art shall understand that he/she can still make modifications to the technical solutions set forth in the above embodiments, or perform equivalent substitutions on some technical features thereof, while these modifications or substitutions do not make the essence of the corresponding technical solutions depart from the spirit and scope of the embodiments of the present disclosure. Any such modifications, equivalent replacements, and improvements made without departing from the essence and principle of the present application shall all fall within the protection scope of the present application.

The invention claimed is:

1. A method for automatically entering a ride apparatus, comprising:
   establishing, by a vehicle, a wireless communication connection with a control system of the ride apparatus;
   sending, by the vehicle via the wireless communication connection, an automatic entering request to the control system of the ride apparatus, the automatic entering request comprising a ride starting position;
   receiving, by the vehicle via the wireless communication connection, status information sent by the control system of the ride apparatus;
   determining, by the vehicle according to the status information, that the ride apparatus has arrived at the ride starting position and that the ride apparatus is in an open-door status, wherein after the ride apparatus has arrived at the ride starting position and is in the open-door status, the ride apparatus enters a delayed closing status, wherein a manual door-closing button of the ride apparatus is disabled for a first predetermined time in the delayed closing status;
   sending, by the vehicle, a locking request to the control system of the ride apparatus, wherein the locking request is for establishing a locking relationship between the vehicle and the ride apparatus, wherein the locking relationship allows the vehicle to enter the ride apparatus;
   determining, by the vehicle, whether a locking instruction is received from the control system of the ride apparatus, wherein the locking instruction indicates that the locking relationship between the vehicle and the ride apparatus has been established; and
   in response to determining that the locking instruction is received from the control system of the ride apparatus, automatically entering, by the vehicle, the ride apparatus.

2. The method according to claim 1, further comprising:
   determining if a current load number of the ride apparatus is smaller than a preset threshold;
   if the current load number is smaller than the preset threshold, automatically entering the ride apparatus; and
   if the current load number is not smaller than the preset threshold, resending the automatic entering request after a second predetermined time.

3. The method according to claim 1, wherein:
   the control system of the ride apparatus comprises an external access point outside the ride apparatus and an internal access point inside the ride apparatus;
   establishing the wireless communication connection with the control system of the ride apparatus comprises establishing wireless communication connection with the external access point; and
   the method further comprises:
      initiating wireless communication connection with the internal access point; and
      if the initiation of the wireless communication connection with the internal access point is unsuccessful, leaving the ride apparatus.

4. The method according to claim 1,
   wherein the locking instruction is sent from the ride apparatus after the ride apparatus determines that a number of vehicles that have established a locking relationship with the ride apparatus is smaller than a preset threshold.

5. The method according to claim 1, wherein automatically entering the ride apparatus comprises:
   acquiring a position of an obstacle;
   acquiring, according to the position of the obstacle, a movement route for automatically entering the ride apparatus; and
   automatically entering the ride apparatus according to the movement route.

6. The method according to claim 5, wherein, before acquiring a movement route for automatically entering the ride apparatus, the method further comprises:
   determining if the movement route for automatically entering the ride apparatus can be acquired; and
   if the movement route for automatically entering the ride apparatus cannot be acquired, providing a voice prompt.

7. The method according to claim 1, wherein the method further comprises:
   after automatically entering the ride apparatus, sending a closing request to the control system of the ride apparatus to switch the ride apparatus to a closed-door status.

8. The method according to claim 1, wherein, after sending the automatic entering request to the control system of the ride apparatus, the method further comprises:
   sending a status check request to the control system of the ride apparatus to request the control system of the ride apparatus to send status information of the ride apparatus; and
   if determining, according to the status information, that the ride apparatus has not arrived at the ride starting position, resending the status check request after a third predetermined time.

9. The method according to claim 1, further comprising:
   detecting an abnormal status and sending a troubleshooting request,
   wherein the abnormal status comprises one or more of the following statuses: the wireless communication connection with the control system of the ride apparatus fails to establish, and the status information sent by the control system is not received.

10. The method according to claim 1, wherein the vehicle comprises a wheelchair, a self-balancing scooter, or a robot.

11. A method for controlling a ride apparatus, comprising:
- establishing a wireless communication connection with a transport vehicle;
- receiving, via the wireless communication connection, an automatic entering request from the transport vehicle, wherein the automatic entering request comprises a ride starting position;
- controlling the ride apparatus to move to the ride starting position;
- controlling the ride apparatus to be in an open-door status;
- controlling the ride apparatus to be in a delayed closing status, wherein a manual closing button of the ride apparatus is disabled for a predetermined time in the delayed closing status;
- sending, via the wireless communication connection, status information to the transport vehicle, wherein the status information indicates that the ride apparatus has arrived at the ride starting position and that the ride apparatus is in an open-door status;
- receiving a locking request from the transport vehicle, wherein the locking request is for establishing a locking relationship between the transport vehicle and ride apparatus, wherein the locking relationship allows the transport vehicle to enter the ride apparatus;
- determining whether a number of transport vehicles that have established a locking relationship with the ride apparatus is smaller than a preset threshold;
- in response to determining that the number of transport vehicles that have established a locking relationship with the ride apparatus is smaller than the preset threshold, sending a locking instruction to the transport vehicle to enable the transport vehicle to automatically enter the ride apparatus, wherein the locking instruction indicates that the locking relationship between the transport vehicle and the ride apparatus has been established.

12. A transport vehicle, comprising a processor and a non-transitory computer-readable storage medium storing instructions that, when executed by the processor, cause the transport vehicle to perform a method for automatically entering a ride apparatus, the method comprising:
- establishing a wireless communication connection with a control system of the ride apparatus;
- sending, via the wireless communication connection, an automatic entering request to the control system of the ride apparatus, the automatic entering request comprising a ride starting position;
- receiving, via the wireless communication connection, status information sent by the control system of the ride apparatus; and
- determining, according to the status information, that the ride apparatus has arrived at the ride starting position and that the ride apparatus is in an open-door status, wherein after the ride apparatus has arrived at the ride starting position and is in the open-door status, the ride apparatus enters a delayed closing status, wherein a manual door-closing button of the ride apparatus is disabled for a first predetermined time in the delayed closing status;
- sending, via the wireless communication connection, a locking request to the control system of the ride apparatus, wherein the locking request is for establishing a locking relationship between the vehicle and the ride apparatus, wherein the locking relationship allows the vehicle to enter the ride apparatus;
- determining whether a locking instruction is received from the control system of the ride apparatus, wherein the locking instruction indicates that the locking relationship between the vehicle and ride apparatus has been established; and
- in response to determining that the locking instruction is received from the control system of the ride apparatus, automatically entering the ride apparatus.

13. A control system of a ride apparatus, comprising a processor and a non-transitory computer-readable storage medium storing instructions that, when executed by the processor, cause the control system of the ride apparatus to perform operations comprising:
- establishing a wireless communication connection with a transport vehicle;
- receiving, via the wireless communication connection, an automatic entering request from the transport vehicle, wherein the automatic entering request comprises a ride starting position;
- controlling the ride apparatus to move to the ride starting position;
- controlling the ride apparatus to be in an open-door status;
- controlling the ride apparatus to be in a delayed closing status, wherein a manual closing button of the ride apparatus is disabled for a predetermined time in the delayed closing status;
- sending, via the wireless communication connection, status information to the transport vehicle, wherein the status information indicates that the ride apparatus has arrived at the ride starting position and that the ride apparatus is in an open-door status;
- receiving a locking request from the transport vehicle, wherein the locking request is for establishing a locking relationship between the transport vehicle and ride apparatus, wherein the locking relationship allows the transport vehicle to enter the ride apparatus;
- determining whether a number of transport vehicles that have established a locking relationship with the ride apparatus is smaller than a preset threshold;
- in response to determining that the number of transport vehicles that have established a locking relationship with the ride apparatus is smaller than the preset threshold, sending a locking instruction to the transport vehicle to enable the transport vehicle to automatically enter the ride apparatus, wherein the locking instruction indicates that the locking relationship between the transport vehicle and the ride apparatus has been established.

\* \* \* \* \*